US005995052A

United States Patent [19]

Sadler et al.

[11] Patent Number: 5,995,052

[45] Date of Patent: Nov. 30, 1999

[54] FLIP OPEN ANTENNA FOR A COMMUNICATION DEVICE

[75] Inventors: Robert A. Sadler, Durham; Gerard Hayes, Wake Forest; John T. Sadler, Raleigh, all of N.C.

[73] Assignee: Ericsson Inc., Research Traingle Park, N.C.

[21] Appl. No.: 09/080,074

[22] Filed: May 15, 1998

[51] Int. Cl.[6] .............................. H01Q 1/24; H04M 1/00

[52] U.S. Cl. ........................................ 343/702; 379/433

[58] Field of Search ............................ 343/702, 700 MS; 379/433, 434

[56] References Cited

U.S. PATENT DOCUMENTS 4,992,799 2/1991 Garay ..................................... 343/702
5,260,998 11/1993 Takagi .................................... 379/433
5,561,437 10/1996 Phillips .................................. 343/702

*Primary Examiner*—Don Wong
*Assistant Examiner*—Jennifer H. Malos
*Attorney, Agent, or Firm*—Wood, Phillips, VanSanten, Clark & Mortimer

[57] ABSTRACT

An antenna for a communication device including a first flip having an antenna element and pivotally mounted on a housing to move from a closed position adjacent to the housing to an operational position angularly space from the housing. A second flip having a conductive element as a ground plane is pivotally mounted on the housing and moves between a closed position adjacent the housing and an open position angularly spaced from both the housing and the first flip. When the first and second flips are in the closed position, they cover the controls and no antenna is exposed on the exterior of the housing. In the operational position, the antenna element and the conductive element form an antenna optimally tuned to the frequency of the wireless network that is less subject to interference by the user.

15 Claims, 6 Drawing Sheets

FLIP OPEN ANTENNA FOR A COMMUNICATION DEVICE

FIELD OF THE INVENTION

This invention relates to antennas for communication devices.

BACKGROUND OF THE INVENTION

Antennas for hand-held communication devices (also called mobile phones, cell phones and mobile stations) are commonly either fixed or telescoping. Each of these antennas has its advantages and disadvantages. A fixed antenna is, by definition, at the optimal length for its operating frequency. Fixed antennas, however, do not store compactly, and hence the antenna is always vulnerable to damage. Telescoping antennas, on the other hand, are protected inside the communication device when not in use. Telescoping antennas, however, can be difficult to open and users are less likely to fully extend the antenna, adversely affecting antenna performance. Particularly when not properly stored, telescoping antennas are more fragile than fixed antennas.

Furthermore, both types of antennas for hand-held communication devices are subject to interference from the user. The user's body absorbs and reflects radio waves in patterns that are difficult to predict when the antenna is designed. Thus, an antenna designed for optimal performance on a given frequency may not perform optimally when actually used by a particular person.

Therefore, it is an object of this invention to provide an antenna that is not subject to bending and breaking, whether in use or stored.

It is a further object of this invention to provide an antenna that can be tuned precisely for the operating frequency of its wireless network.

It is a further object of this invention to provide an antenna that can minimize interference caused by the human body.

SUMMARY OF THE INVENTION

These and other objects and advantages are achieved by our flip antenna for a communication device. Our flip antenna comprises a first piece or "flip" having an antenna element. The first flip is pivotably mounted on the communication device housing to move between a closed position adjacent to the housing and an operational position angularly spaced from the housing. A second flip having a conductive surface opposite to the antenna element provides a ground reference for the antenna element. The second flip is pivotably mounted on the housing, between the housing and the first flip, to move between a closed position adjacent the housing and an operational position angularly spaced from both the housing and the first flip.

In the operational position, the angle between the first and second flips provides optimal tuning for the operating frequency of the communication device. Advantageously, in the operational position the angle between the first and second flips is tunable so that the parasitic capacitance matches a second resonance to create a dual-band single impedance antenna. Further, the conductive surface on the second flip is between the antenna element and the user, which shields the antenna from inference caused by the human body. In the closed position, the first flip covers the housing and the second flip, so that there is no exposed antenna.

BRIEF DESCRIPTION OF THE DRAWINGS

A more complete understanding of the invention may be obtained from consideration of the following description, taken in conjunction with the drawings, in which.

DETAILED DESCRIPTION

Figure 1:
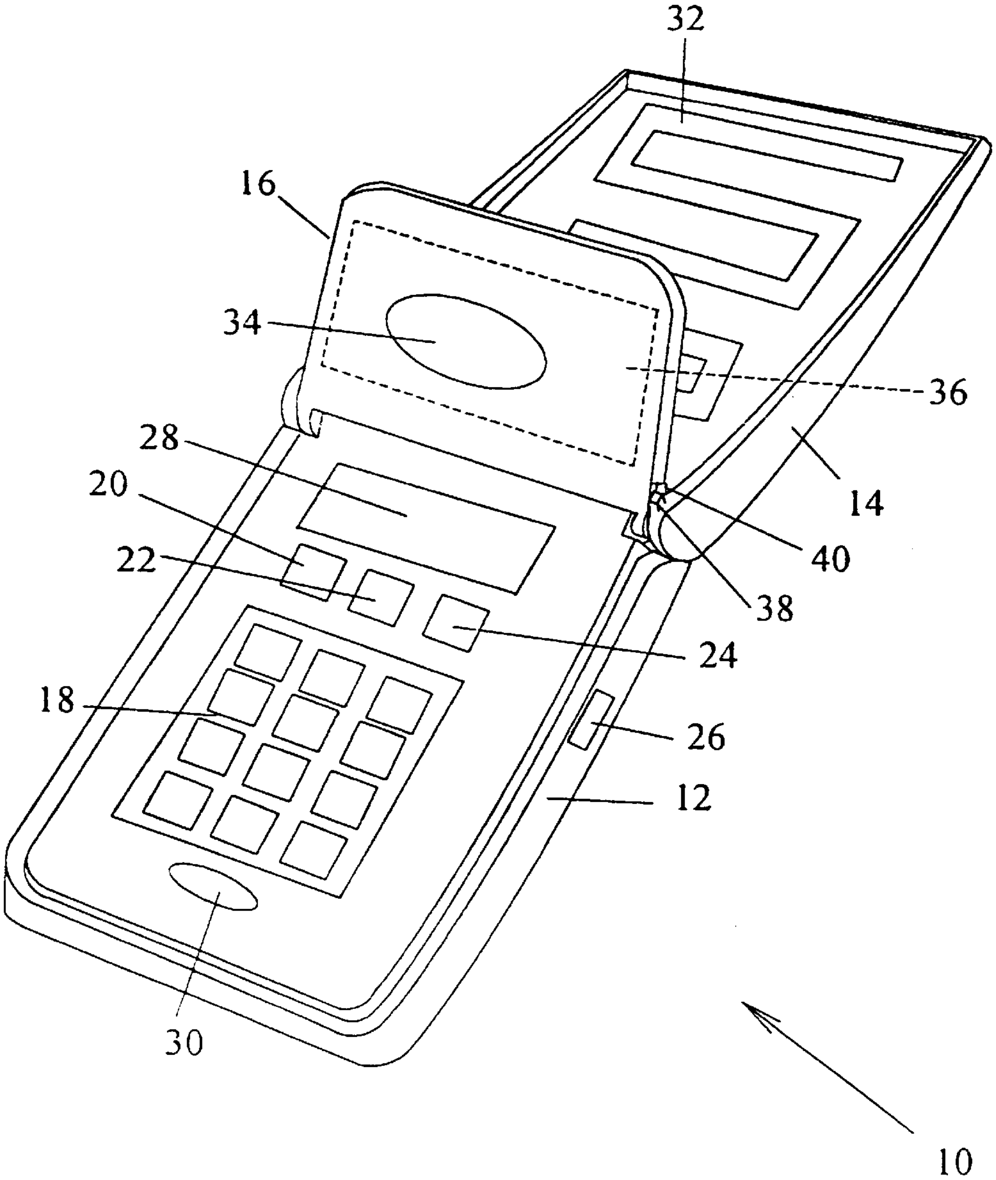
FIG. 1 is a perspective view of a communication device utilizing a flip antenna according to an exemplary embodiment of this invention.

FIG. 1 is a perspective view of a hand-held communication device according to an exemplary embodiment of our invention, shown generally at 10. Communication device 10 comprises a housing 12, a first flip 14 and a second flip 16. Housing 12 includes operational controls for communication device 10. Such controls include keypad 18 and function buttons 20, 22 and 24 (send, end and clear), as known in the art. Optional side mounted control 26 performs functions such as volume control and/or power on-off. A display 28 provides information to the user regarding the current state of communication device 10. Housing 12 also includes microphone 30.

First flip 14 includes an antenna element 32. Second flip 16 includes a speaker 34 and a conductive element 36. FIG. 1 illustrates communication device 10 in the operational position. In this exemplary embodiment, speaker 34 is part of second flip 16 to maintain the spacing between microphone 30 and speaker 34 at a comfortable distance for the user. Speaker 34 may optionally be on housing 12, above display 28. Engagement tab 38 on first flip 14 engages engagement tab 40 on second flip 16 to pull second flip 16 up from its closed position into an operational position when first flip 14 is moved into the operational position.

Figure 2:
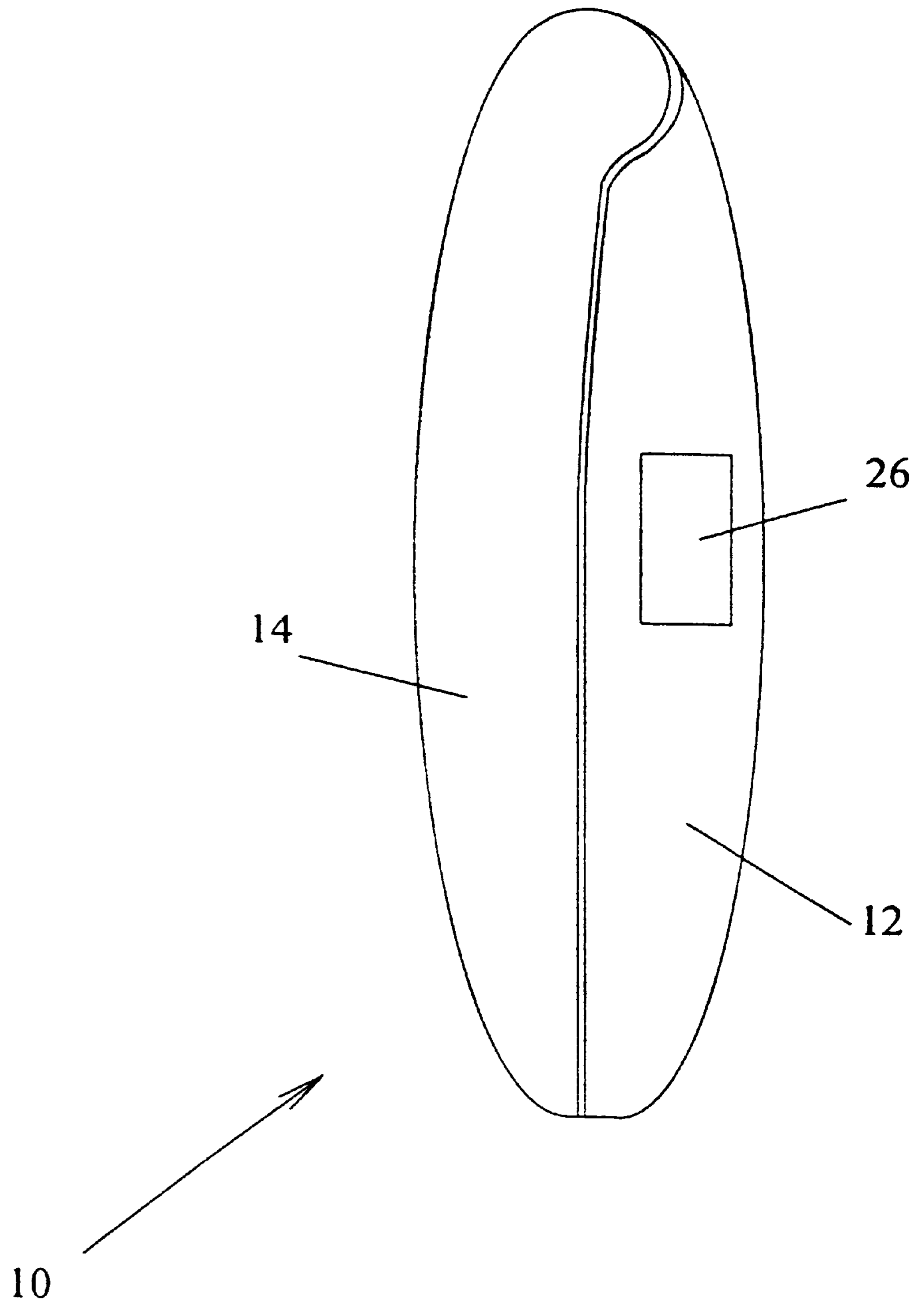
FIG. 2 is a side view of the communication device of FIG. 1 illustrating a closed position of the flip antenna and housing.

FIG. 2 is an illustration of communication device 10 in its closed position. In the closed position, first flip 14 covers the operational controls on housing 12. As seen in this illustration, there is no exposed antenna. Thus, there is nothing to break or bend. The only exposed control is volume/on-off switch 26.

Figure 3:
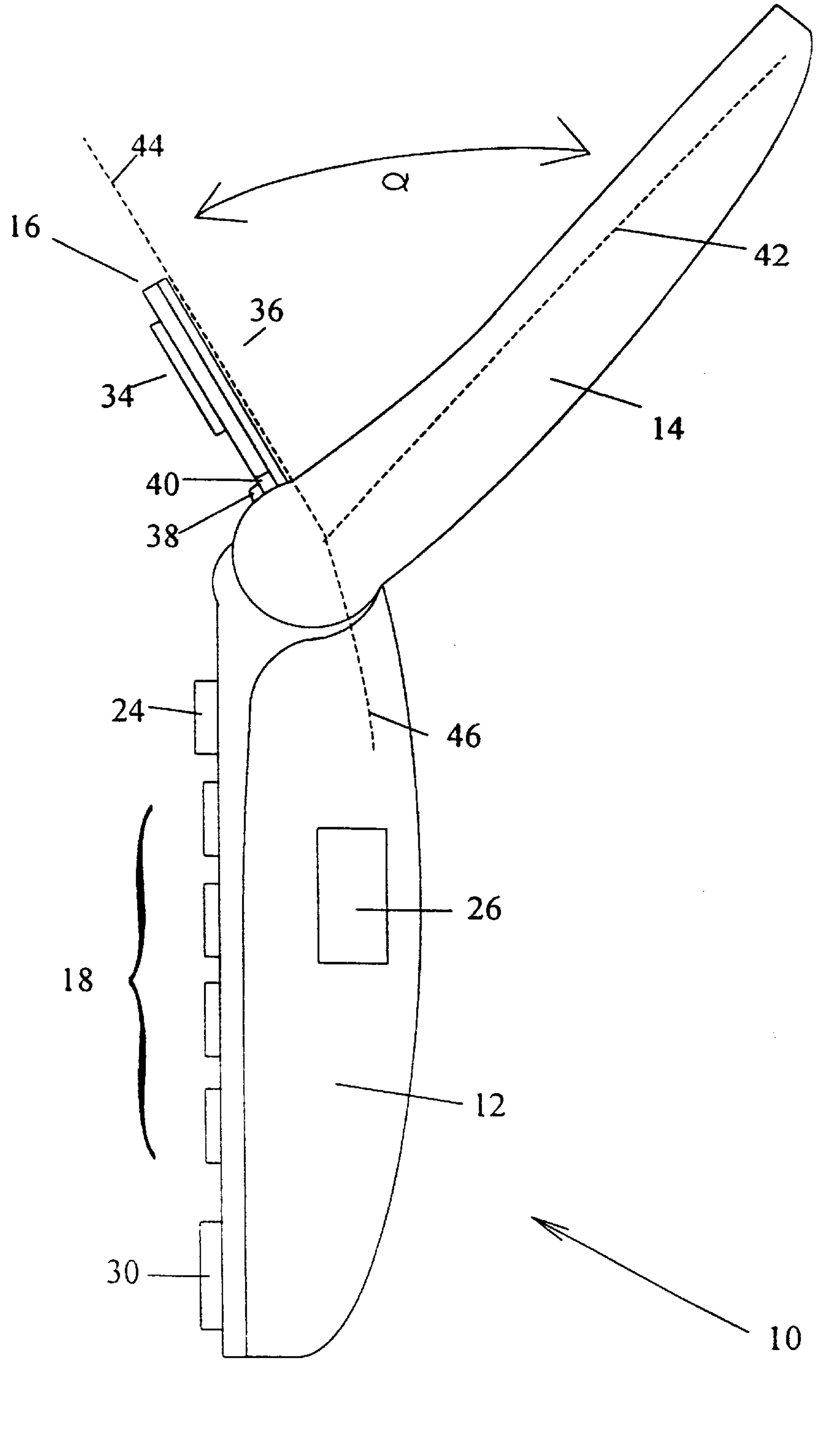
FIG. 3 is a side view of the communication device of FIG. 1 illustrating an operational position of the flip antenna.

Turning now to FIG. 3, a side view of communication device 10 is shown in its operational position. First flip 14 is angularly spaced from housing 12. Controls such as function button 24 and keypad 18 are now accessible. Furthermore, microphone 30 and speaker 34 are in a usable position. Engagement tab 38 has moved engagement tab 40 to move second flip 16 into the operational position.

In this operational position, the plane 42 of antenna 32 and the plane 44 of conductive element 36 are spaced from each other by an angle $\alpha$. This angle is set at the factory for optimal operation of the antenna for the frequency or frequencies that communication device 10 will operate on. Conductive element 36 generally comprises a ground plane for antenna element 32. Additionally, conductive element 36 shields the antenna from the effects of the human body. To further improve the performance of antenna element 32, metal plating or foil forming an additional ground plane 46 (shown in phantom) may be included in the interior of the top portion of housing 12, as is currently practiced in the art.

Antenna element 32 generally comprises a half wave or quarter wave antenna. When antenna element 32 is the length of a quarter wave, angle 60 between antenna element 32 and conductive element 36 is more important to proper functioning of the antenna than when antenna element 32 is a half wave. Advantageously, when antenna element 32 is a half wave, the angle α may be adjusted so that the impedance of the antenna matches a second resonance to create a single input, dual band antenna, which configuration is useful in a dual mode communication device (i.e., when the communication device operates in both 800 and 1900 Mhz frequencies).

Figure 4:
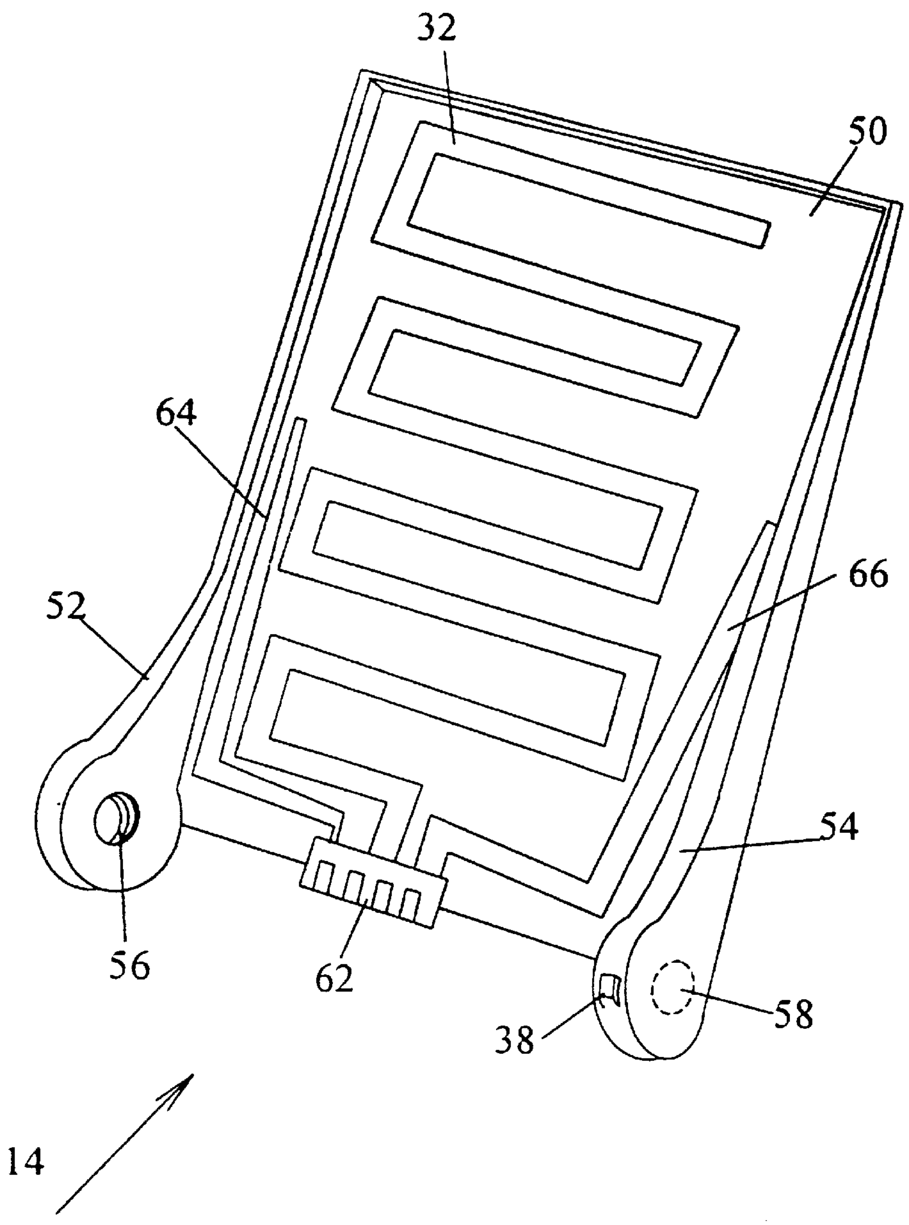
FIG. 4 is a perspective view of the first flip of the flip antenna.

FIG. 4 is an illustration of a first flip 14 according to this exemplary embodiment. First flip 14 includes the antenna element 32. Antenna element 32 is illustrated as metal strip secured to the surface 50 that faces the housing 12 when the first flip 14 is closed. Alternatively, antenna element 32 may be a metal patch or trace, or some other form of conductive material. Further, antenna element 32 may be wire secured to the surface of first flip 14 or molded into the flip.

First flip 14 includes integral side portions 52 and 54. Side portions 52 and 54 include holes 56 and 58, respectively, to facilitate mounting on an axle to form a hinge. Side portion 54 also includes first engagement tab 38. Engagement tab 38 engages a further engagement tab 40 on second flip 16 (as will be shown below) in order to lift second flip 16 while first flip 14 is being open and moved to the operational position.

Modular plug 62 engages a plug on the back of housing 12 (not shown) to connect antenna element 32 electrically to the communications circuitry in housing 12. Alternatively, wires or another connection device may replace modular plug 62. Optionally, there may be additional antenna traces 64 and 66. Traces 64 and 66 provide an additional ground plane or provide a second antenna element for multiband operation.

Figure 5:
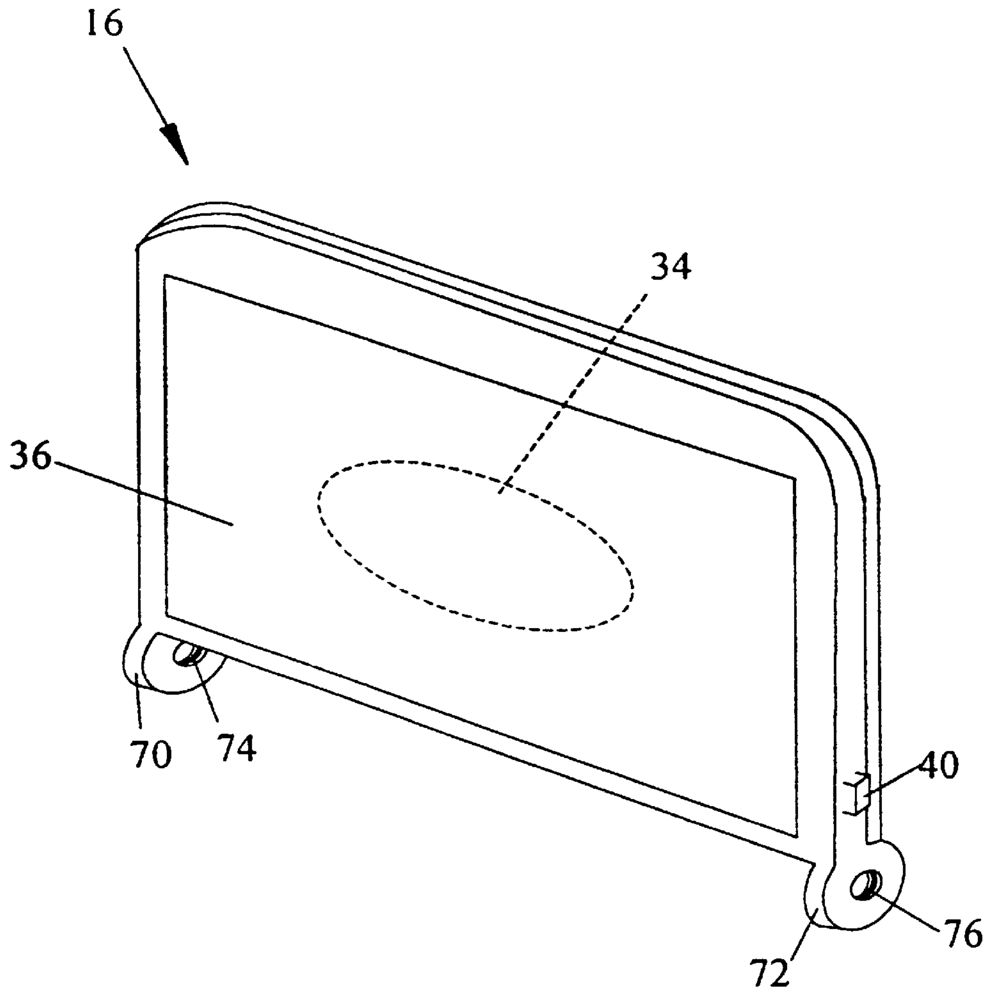
FIG. 5 is a perspective view of the second flip of the flip antenna.

Turning to FIG. 5, second flip 16 is illustrated. Second flip 16 includes a conductive element 36 on one side. As described above, conductive element 36 provides a ground plane for an antenna and provides shielding between the antenna and the user according to this exemplary embodiment. Conductive element 36 comprises metal foil in this illustration, but may also comprise a piece of metal or other conductive material. Additionally, conductive element 36 may be molded into second flip 16.

Second flip 16 includes hinges 70 and 72 with holes 74 and 76, respectively, for mounting second flip 16 on the same axle as first flip 14. Second flip 16 fits inside side plates 52 and 54 of first flip 14. A second engagement tab 40 on second flip 16 engages first engagement tab 38 of first flip 14 moving second flip 16 from a closed position adjacent to housing 12 to an open, operational position when first flip 14 is itself pivoted to its operational position (shown in FIG. 3). Alternatively, second flip 16 may be biased towards the operational position by a spring, which pivots second flip 16 into the operational position when first flip 14 is manually pivoted to the operational position. A speaker 34 (shown in phantom) is optionally mounted on second flip 16. Alternatively, speaker 34 may be molded into second flip 16.

Figure 6:
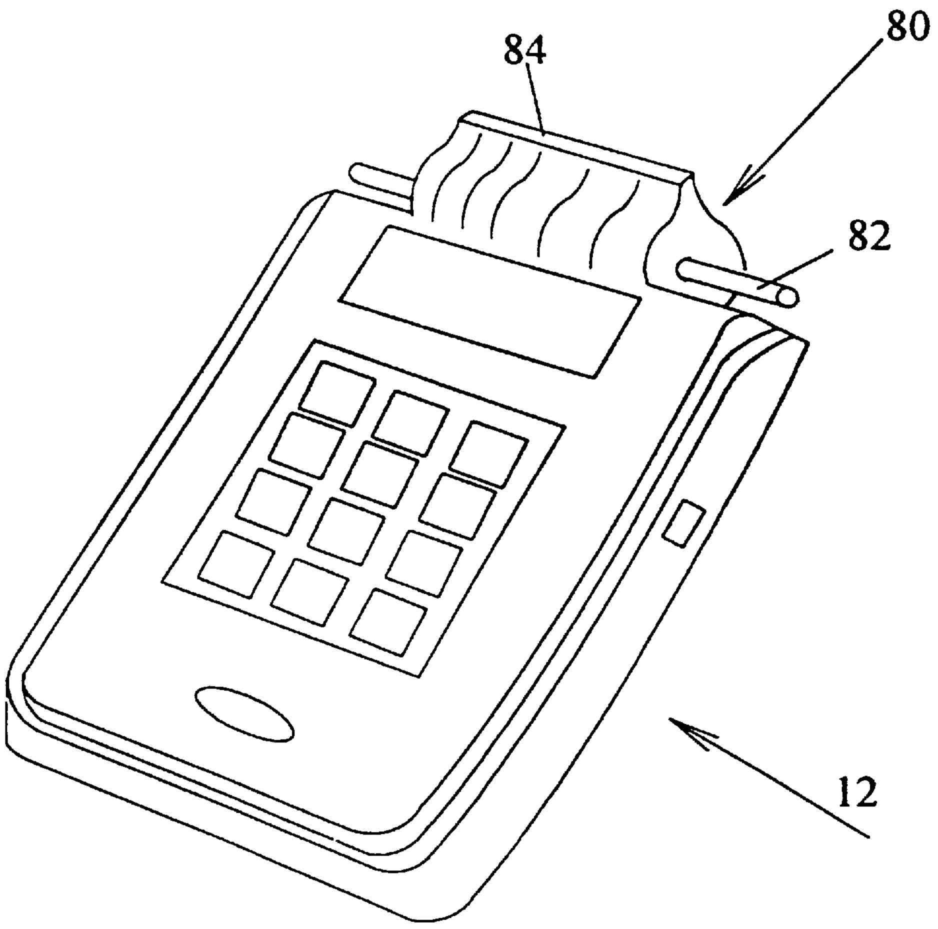
FIG. 6 is a perspective view of the housing of the communication device of FIG. 1

In FIG. 6, housing 12 is illustrated with the first and second flips 14, 16 removed. Housing 12 includes a mounting portion 80 on its top side with an axle 82 protruding from either side. First flip 14 and second flip 16 are pivotally mounted on axle 82. Axle 82 may be biased outwardly by internal springs so that they can be compressed for installation and removal of first and second flips 14, 16. Mounting portion 80 also includes a stop 84 that engages second flip 16 to stop it in its operational position. Adjusting the position of stop 84 adjusts the angle between the first and second flips.

It is to be understood that the above-described embodiment is an illustration of our invention and that may variations may be devised by those skilled in the art without departing from the scope of this invention. For example, an antenna according to our invention can be used with hand-held two-way radios: Therefore, this invention is limited only by the following claims.

What is claimed:

1. An antenna for a hand-held communication device having a housing, said antenna comprising:

a first flip pivotally mounted on said housing for movement between a closed position adjacent to said housing and an operational position spaced from said housing, said first flip having an antenna element; and a second flip pivotally mounted on said housing and moving from a closed position adjacent said housing and an operational position angularly spaced from both said housing and said first flip, said second flip having a conductive element opposite said antenna element forming a ground plane for said antenna.

2. An antenna in accordance with claim 1 wherein said first and second flip each have a top portion and a bottom portion, said antenna further comprising a first hinge on the bottom portion of said first flip and a second hinge on said bottom portion of said second flip, wherein both said first and second hinges guide said flips for rotation about an axis passing through said housing.

3. An antenna in accordance with claim 2 further comprising a first engagement tab on said first hinge engaging said second flip to rotate said second flip from said closed position to said operational position when said first flip is moved from said closed position to said operational position.

4. An antenna in accordance with claim 3 further comprising a stop on said housing to stop said second flip at said open position.

5. An antenna in accordance with claim 4 wherein said antenna comprises a single input dual-band antenna.

6. An antenna in accordance with claim 1 wherein said second flip incorporates a speaker.

7. An antenna in accordance with claim 1 wherein said antenna element comprises a conductive trace.

8. An antenna in accordance with claim 1 wherein said antenna element comprises a strip of metal.

9. An antenna in accordance with claim 8 wherein said first flip is molded, and wherein said conductive strip is molded into said first flip.

10. A communication device comprising:

a housing having a front with operating controls and an end having an axle;

a first flip having an integrated antenna element pivotable on said axle from a closed position covering the front of said housing to an operational position; and a second flip having a conductive element opposed to said antenna element pivotable on said axle between a closed position between said housing and said first flip and an operational position at an angle from said first flip, wherein said antenna element and said conductive element form an antenna for said communication device.

11. A communication device in accordance with claim 10 further comprising a first engagement tab on said first flip engaging said second flip to rotate said second flip to its operational position when said first flip is moved to its operational position.

12. A communication device in accordance with claim 11 further including a stop on said housing to stop said second flip at its operational position as said first flip is moved to said operational position.

13. A communication device in accordance with claim 10 wherein said second flip includes a speaker.

14. A communication device comprising:

an operational unit including user controls, a microphone and a radio communications device; and an antenna including a cover pivotally mounted on said operational unit and including an antenna element, said cover pivoting from a closed position adjacent to said user controls and protecting said antenna element to an operational position angularly spaced from said user controls exposing said antenna element, and an intermediary conductive element pivoting on a closed position between said cover and said user controls to an operational position at a defined angle with said cover in said operational position.

15. A communication device in accordance with claim 14 wherein said intermediary conductive element includes a speaker.

* * * * *